United States Patent [19]

Iwashita et al.

[11] 4,272,173
[45] Jun. 9, 1981

[54] MOTOR DRIVE UNIT FOR CAMERA HAVING VARIABLE WINDING SPEED CHARACTERISTICS

[75] Inventors: Tomonori Iwashita, Fuchu; Hidehiko Fukahori, Kawasaki; Yukio Mashimo, Tokyo, all of Japan

[73] Assignee: Canon Kabushiki Kaisha, Tokyo, Japan

[21] Appl. No.: 58,623

[22] Filed: Jul. 18, 1979

[30] Foreign Application Priority Data

Jul. 25, 1978 [JP] Japan .................................. 53-90589

[51] Int. Cl.³ .............................................. G03B 1/18
[52] U.S. Cl. .................................................. 354/173
[58] Field of Search ............................. 354/170–173, 354/204, 212; 352/180

[56] References Cited

U.S. PATENT DOCUMENTS

| 1,007,012 | 10/1911 | Spinks | 352/180 |
| 3,909,835 | 9/1975 | Ito et al. | 354/204 |
| 3,951,531 | 4/1976 | Nakai et al. | 352/180 X |
| 4,171,892 | 10/1979 | Kozuki et al. | 354/173 |

Primary Examiner—L. T. Hix
Assistant Examiner—Thomas H. Tarcza
Attorney, Agent, or Firm—Toren, McGeady & Stanger

[57] ABSTRACT

A motor drive unit for a camera having variable winding speed characteristics functions so as to operate in a manner suited to environmental conditions such as temperature. This is done by changing the gear ratio from the motor to one of two values near the point of maximum efficiency and the point of maximum power output of the characteristic curve of the motors. Timer-controlled change of film frequency variation for providing a combined effect with the gear ratio is also disclosed.

7 Claims, 8 Drawing Figures

MOTOR DRIVE UNIT FOR CAMERA HAVING VARIABLE WINDING SPEED CHARACTERISTICS

FIELD OF THE INVENTION

This invention relates to motor drive units for cameras and, more particularly, to a motor drive unit having variable winding-up speed characteristics.

BACKGROUND OF THE INVENTION

In a motor drive unit for performing film winding operation of a camera, there is a direct-current motor drivingly connected to the film wind-up mechanism in the camera, which is supplied with electrical energy from a battery. Because of the limitation of the capacity of the battery and the power output of the motor and since the motor drive unit is required to be constructed in the form of small size and light weight, it is desired to operate the motor as efficiently as possible. Such operation will also prolong the life time of the battery. A further requirement for the motor drive unit is to allow for increase in the film frame frequency. In this respect, the operating condition of the motor is necessarily at the maximum possible output, particularly when the given photographic situation is at a normal temperature condition.

In general, however, as is understood from the characteristic curves of a D.C. motor, taking the example illustrated in FIG. 1, a value of torque A at which the efficiency reaches the maximum level differs from that of torque B at which the power output reaches the maximum. It is, therefore, well known to those skilled in the art of motor drive units adapted for use with cameras, that the requirement of increasing the winding speed is better fulfilled by operating the motor at the point B for the maximum power output, while the requirement of minimizing the electrical energy consumption to achieve an increase in the number of film cartridges fed per battery is better fulfilled by operating the motor at the point A for maximum efficiency. On the other hand, the relationship between the output torque of the motor and the winding-up torque may be expressed as:

$$\text{Output Torque} = \frac{\text{Winding Torque}}{\text{Gear Ratio}}$$

Increase of the winding speed therefore makes the torque of the motor increase. For this purpose, the gear ratio may be decreased. Increase of the number of film cartridges fed per battery decreases the torque of the motor. This calls for an increase in the gear ratio.

The motor drive unit for use with the still camera stands in need of an improvement for snap-shot photography by speeding up the winding operation to as fast a value as possible. On this account, the gear ratio must be decreased so as to effect an approach to the B point. But, when the camera is used under low temperature conditions, since the film is so hardened and the lubricant oil used in the winding mechanism is so increased in viscosity, the winding torque is necessarily increased. This leads to increase of the output torque of the motor provided that the gear ratio remains unchanged. Thus, the consumption of electrical current is increased. Since, as the electrical power source of the motor drive unit, general use is made of a dry battery which deteriorates in performance as the ambient temperature decreases, the adjustment of the gear ratio to the neighborhood of the point B in the characteristic curves of FIG. 1 will result in an extremely large decrease in the number of film cartridges fed per battery due to the increase of the electrical power consumed and the deterioration of the battery.

Besides this, the motor drive unit for the still camera has found its use in a wide range of fields, so there is a demand for making variable the interval between the successive exposures. Consequently, the wider the range of variation of interval, the greater versatility the unit will have.

The conventional motor drive unit for the still camera is designed to have a gear ratio determined by taking into account an intermediate point between the points A and B in the graph for the operating characteristics of the motor, so that the winding speed at the normal temperature can be increased to some extent and the number of film cartridges fed at low temperature can also be increased to some extent. As a result, therefore, it is impossible to operate the motor under the maximum conditions of efficiency and power output.

The prior art has also employed a timer to change the exposure interval. Such timer is, however, provided with only one changeable position, and the provision of two or more switchable positions in the timer is inconvenient from the standpoint of management. If the timer is of the type in which the exposure interval is varied with resistance by which the voltage to the motor is varied, the amount of electrical energy used up by the resistance is not negligible. This results in the disadvantage that the efficiency of the unit will be deleteriously affected.

With the foregoing problems in mind, an object of the present invention is to provide a motor drive unit with the gear ratio made variable so that it is at the normal temperature to effect the operation at or near the B point for the maximum power output, and at a low temperature to effect the operation at or near the A point for the maximum efficiency. Thus, the optimum performance is always assured in any photographic situation which may be encountered.

Another object of the present invention is to provide a combined effect of two kinds of film frequency variation, one which is based on the above-described gear ratio change and the other on the varied time by the timer.

SUMMARY OF THE INVENTION

In accordance with the invention, an automatic winding-up device having an electric motor for performing winding-up operation by the driving force of the motor comprises driven winding-up means, motion transmitting means for drivingly connecting the motor with the driven winding-up means, the motion transmitting means having two different transfer factors, and selecting means operatively connected to the motion transmitting means for selecting either one of the two transfer factors. In a particular form of the invention, one of the transfer factors is pre-adjusted to a value corresponding to the maximum torque of the motor with the motion transmitting means, or to a value in the vicinity thereof. In another form of the invention, one of the transfer factors is pre-adjusted to a value corresponding to the maximum efficiency of the motor with the motion transmitting means or to a value in the neighborhood thereof.

For a better understanding of the present invention, reference is made to the following description and accompanying drawings, while the scope of the present invention will be pointed out in the appended claims.

DESCRIPTION OF THE PREFERRED EMBODIMENTS

Figure 2:
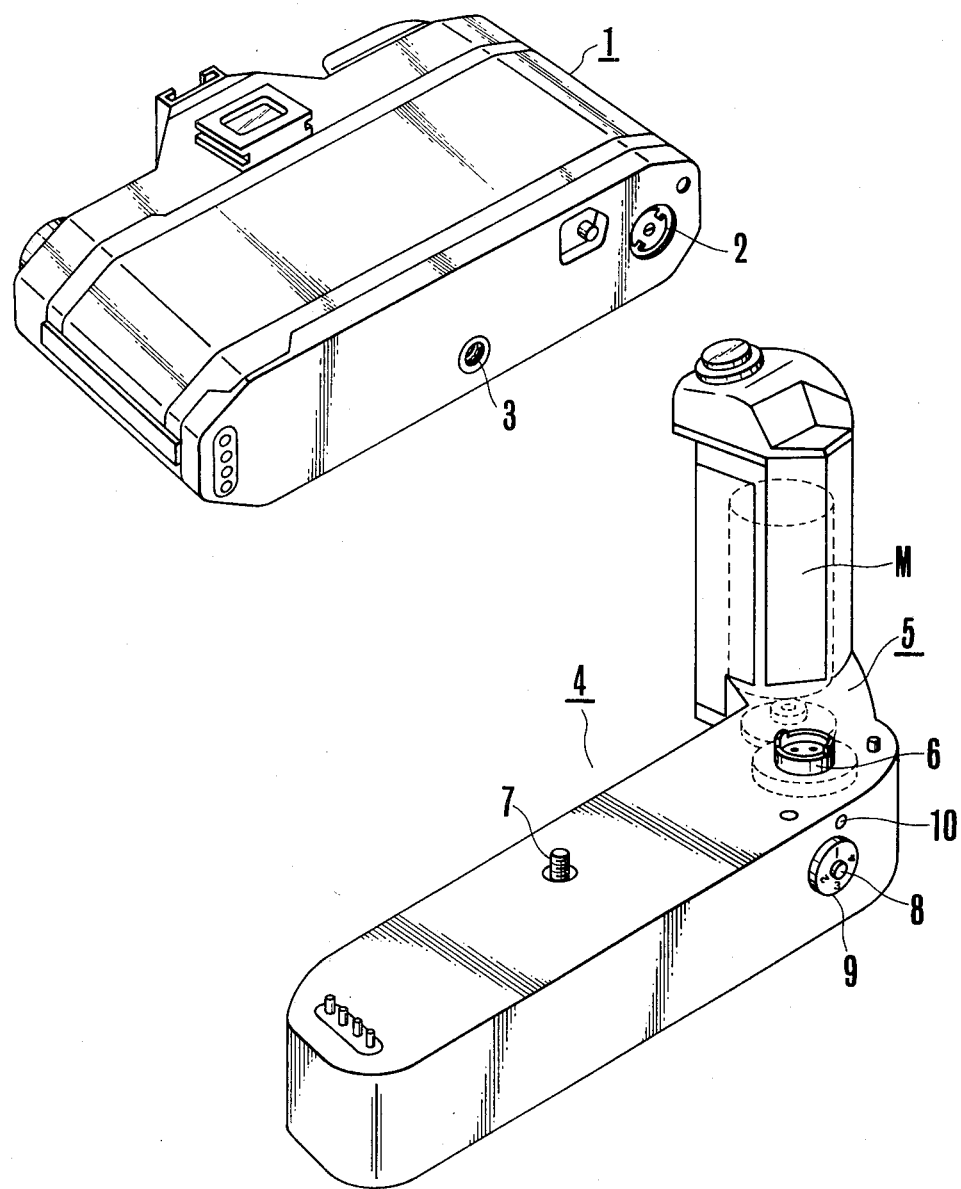
FIG. 2 is a perspective view illustrating an example of a camera and a motor drive unit therefor.

In FIG. 2, element 1 is a camera body, on the bottom panel of which are arranged a winding-up coupler 2 which cooperates with a wind-up mechanism and a shutter mechanism for performing winding operation, a tripod screw receptor 3, and the like. Element 4 is a motor drive device in which are arranged an electric motor M as the drive source, a gear train 5 and a winding-up coupler 6 to engage with the coupler 2 in the camera. To attach the unit 4 to the camera body 1, a fastener screw 7 on the motor drive unit 4 is brought into fixedly secured relation with the receptor 3 in the camera housing by operating a knob (not shown) of the screw 7. Element 8 is a gear ratio change-over button which, upon depression, operates to change-over the gear ratio in a manner which will be described later. Element 9 is a timer change-over knob which operates, upon rotation, to change the timer period; element 10 is an index for the timer.

Figure 3:
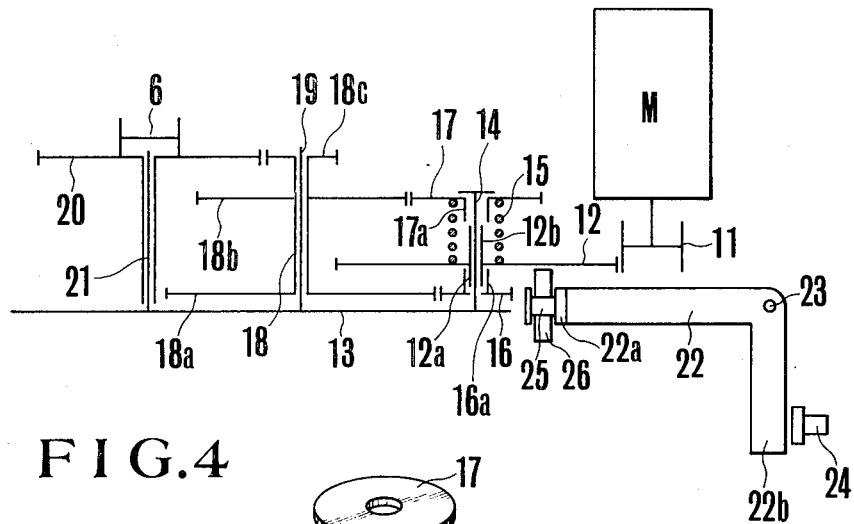
FIG. 3 is a schematic diagram of one embodiment of a gear ratio varying mechanism in the motor drive unit according to the present invention.

FIG. 3 shows one embodiment of a gear ratio varying mechanism in the motor drive unit according to the present invention. In the figure, M is a direct-current motor; 11 is a first gear fixedly mounted on the shaft of the motor M, and meshing with a second gear 12. To permit vertical movement of the second gear 12, the first gear 11 is designed to have a sufficiently long face width. The second gear 12 is rotatably mounted on a shaft 14 which is fixedly mounted on a support plate 13, and meshes with the first gear 11. At the central part of the gear 12 there are downwardly extending first pawls 12a and upwardly extending second pawls 12b. The shaft 14 is affixed to the ground plate 13 and supports the gear 12 and gears 16 and 17 for rotation thereof. Element 15 is a spring lying between the gears 12 and 17 to always urge the second gear 12 in a downward direction.

Figure 4:
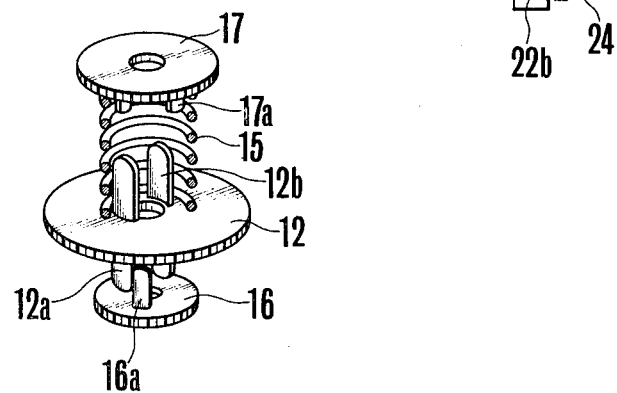
FIG. 4 is a perspective view illustrating the construction of the change-over switch of FIG. 3.

FIG. 4 is a perspective view illustrating the construction and arrangement of the gears 12, 16 and 17; element 16 is a third gear with pawls 16a extending from the upper surface thereof to engage with the pawls 12a of the second gear 12. The fourth gear 17 is also provided with pawls 17a downwardly extending to be engageable with the pawls 12b of the second gear 12. It is noted that, although the pawls 17a, 12b and 12a, 16a are shown as arranged not to be engaged with each other in FIG. 3 for the purpose of better understanding, their true relationship is shown in FIG. 4. Element 18 is a fifth gear rotatably mounted on a shaft 19 which is affixed to the ground plate, and geared portions 18a, 18b and 18c. The geared portion 18a is affixed to the downmost end of the fifth gear 18 and meshes with the third gear 16. The geared portion 18b is affixed to the fifth gear 18 at an intermediate thereof and meshes with the fourth gear 17. The geared portion 18c affixed to the top end of the fifth gear 18 meshes with a sixth gear 20. This sixth gear 20 is rotatable about a shaft 21 affixed to the ground plate 13 and carries a winding-up coupler 6 (see FIG. 2) on the top end thereof. Element 22 is a lever for change of the gear ratio pivotal about a shaft 23 planted on the housing (not shown) with an upwardly standing portion at one end thereof having a shaft 25 affixed thereon; element 24 is a pin arranged upon depression of the button 8 of FIG. 4 to move toward one end 22b of the lever 22 and to turn the lever 22 in a clockwise direction; element 26 is a roller rotatably mounted on the shaft 25 affixed on one end 22a of the lever 22 and arranged upon clockwise movement of the lever 22 to lift up the gear 12 against the force of the spring 15.

Figure 5:
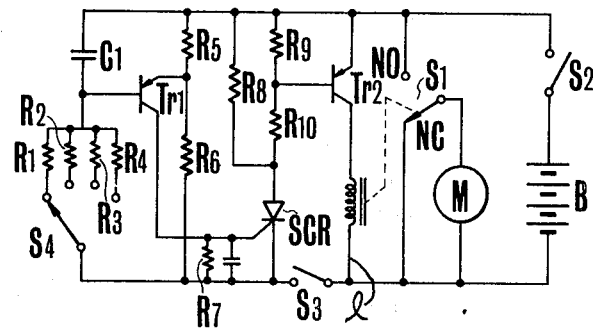
FIG. 5 is an electrical circuit diagram of the unit of FIG. 2.

FIG. 5 is an electrical circuit diagram of the unit of the present invention shown in FIG. 2. In the figure, B is an electrical power source battery; S2 is a main switch; M is a drive motor adapted to be short-circuited when a contact S1 of a relay 1 is moved to an NC position and to be supplied with drive current when in a NO position and when the main switch S2 is turned on; S3 is a switch arranged to be turned off when the winding of the camera has been completed, and to be turned on when a release is completed; S4 is a timer change-over switch actuable by turning the knob 9 shown in FIG. 2; C1 is a condenser of a time constant circuit of the timer; Tr1, Tr2 are transistors; SCR is a thyristor; R1 . . . R4 are resistors of the time constant circuit of the timer; R5 . . . R10 are resistors; C2 is a condenser.

The operation of the embodiment of the present invention shown in FIGS. 3, 4 and 5 will now be described. In a state where the gear ratio change-over button is not yet depressed, the gear change-over mechanism assumes a position shown in FIGS. 3 and 4 so that the first pawls 12a of the second gear 12 engage with the pawls 16a of the third gear 16, and the second pawls 12b of the second gear 12 are disengaged from the pawls 17b of the fourth gear 17. In this state, therefore, the transmission of driving force of the motor M is performed in a certain order, to wit: motor M first gear 11- second gear 12- third gear 16- first geared portion 18a of the fifth gear- third geared portion 18c of the fifth gear- sixth gear 20- winding-up coupler 6, with rotation of the winding-up coupler 6 being transmitted into the camera.

Next, when the gear ratio change button 8 is depressed, the pin 12 is moved to the left as viewed in FIG. 3, causing the lever 22 to turn in the clockwise direction and, therefore, causing the second gear 12 to be lifted up through the roller 25. Thus, the first pawls 12a of the second gear are disengaged from the pawl 16a of the third gear and, instead, the second pawls 12b of the second gear 12 are engaged with the pawls 17a of the fourth gear. It is noted that since the face width of the first gear is long, the engagement of the second gear with the first gear remains effective therethrough. In this state, therefore, the transmission of driving force of the motor M is performed in a certain order, to wit: motor M first gear 11- second gear 12- fourth gear 17- second geared portion 18b of the fifth gear- third geared portion 18c of the fifth gear- sixth gear 20- winding-up coupler 6.

Now assuming that the gears 11 to 20 have tooth members Z11 to Z20, respectively, then the first state where the button 8 is not depressed provides a gear ratio $\eta_1$ defined by:

$$\eta_1 = \frac{Z12}{Z11} \times \frac{Z18a}{Z16} \times \frac{Z20}{Z18c}$$

The second state where the button 8 is depressed provides a gear ratio $\eta_2$ defined by:

$$\eta_2 = \frac{Z12}{Z11} \times \frac{Z18b}{Z17} \times \frac{Z20}{Z18c}$$

Figure 1:
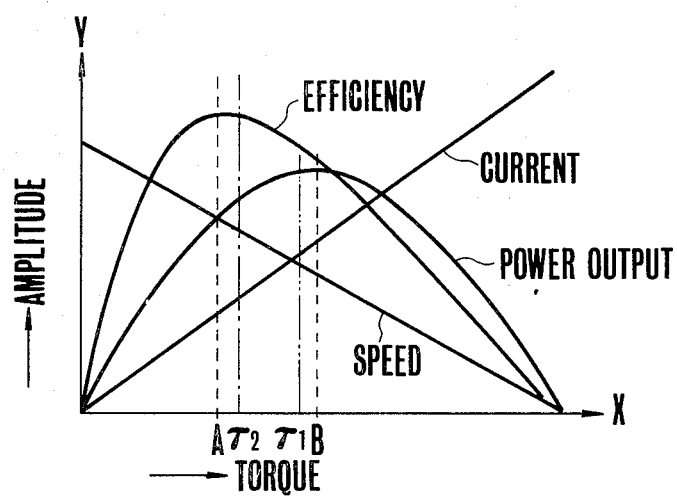
FIG. 1 is a graph illustrating the operating characteristics of a D.C. motor.

Assume, again, that in order to increase the film frame frequency, the operation of the motor is controlled to produce a torque $\tau_1$ approximately equivalent to the maximum output point B shown in FIG. 1, while in order to lengthen the lift time of the battery, the operation of the motor is controlled to produce a torque $\tau_2$ approximately equivalent to the maximum efficiency point A shown in FIG. 1, the gear ratios $\eta_1$ and $\eta_2$ have to satisfy the following equations:

$$\eta_1 = T/\tau_1$$

$$\eta_2 = T/\tau_2$$

where T is the concurrent winding torque of the camera.

When the winding torque of the camera T=2000 gr−cm, and the torques of the motor $\tau_1$=100 gr−cm and $\tau_2$=50 gr−cm, the numerical data of the tooth numbers are, taking an example, Z11=10 (teeth), Z12=50, Z16=20, Z17=12, Z18a=40, Z18b=48, Z18c=20, and Z20=40. For the first state where the required value of gear ratio is:

$$\eta_1 = \frac{T}{\tau_1} = \frac{2000}{100} = 20$$

the actual value of gear ratio found is:

$$\eta_1 = \frac{Z12}{Z11} \times \frac{Z18a}{Z16} \times \frac{Z20}{Z18c} = \frac{50}{10} \times \frac{40}{20} \times \frac{40}{20} = 20$$

Thus, good agreement is shown.

For the second state where the required value of gear ratio is:

$$\eta_2 = \frac{T}{\tau_1} = \frac{2000}{50} = 40$$

the actual value of gear ratio found is:

$$\eta_2 = \frac{Z12}{Z11} \times \frac{Z18b}{Z17} \times \frac{Z20}{Z18c} = \frac{50}{10} \times \frac{48}{12} \times \frac{40}{20} = 40$$

Thus, good agreement again is shown. Since the gear ratio in the driving force transmitting path is made smaller when the button 8 is not depressed, the depression of the button 8 leads to increase of the speed of rotation of the coupler 6. It is noted that the numbers of gears in these two transmission paths are equal to each other; the direction of rotation of the coupler 6 relative to the direction of rotation of the motor M remains the same in changing the gear ratio.

In FIG. 5, after a shutter (not shown) has been released by release operation of a release device (not shown), when the release operation is completed, the release switch S3 is turned on. If the switch S4 is connected to R1 at this time, then in a time interval determined by C1 and R1, the transistor Tr1 is turned on, thereby the SCR is turned on. Then, Tr2 is turned on to energize the relay 1. Thus, the switch S1 is moved from NC position to NO position at which the motor M starts to rotate. When the winding operation is completed, the switch S3 is turned off, thereby the SCR is turned off to de-energize the relay 1. Thus, the switch S1 is moved from NO to NC position where the motor M is stopped. At this time, if the release drive is actuated again, the camera will operate successively in the continuous mode. Alternatively, if the release is no longer effective, single frame exposure operation results. Upon operation of the timer switch S4 by the knob 9 of FIG. 2, the resistance value of the time constant circuit is varied to vary the timer period, that is, the time interval from the moment at which the release has been completed to the moment at which the winding operation starts. Thus, the apparent winding time is varied and, therefore, the frame frequency is varied.

Figure 6:
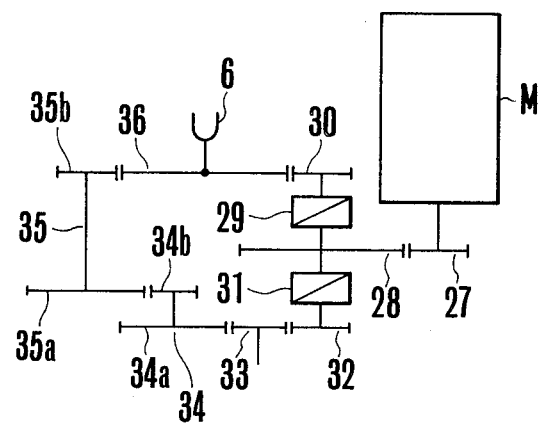
FIG. 6 is a schematic diagram of another embodiment of a gear ratio changing gear train according to the present invention.
Figure 8:
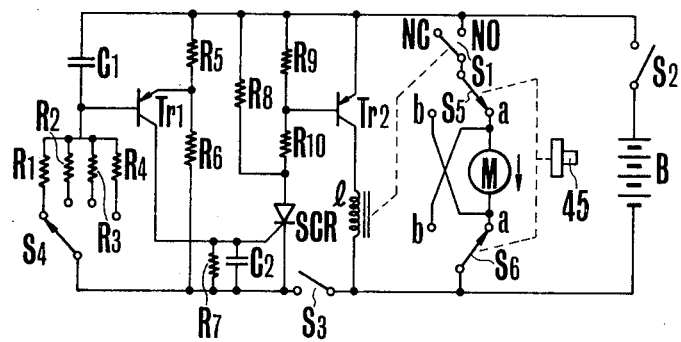
FIG. 8 is an electrical circuit diagram of the unit of FIG. 6.
Figure 7:
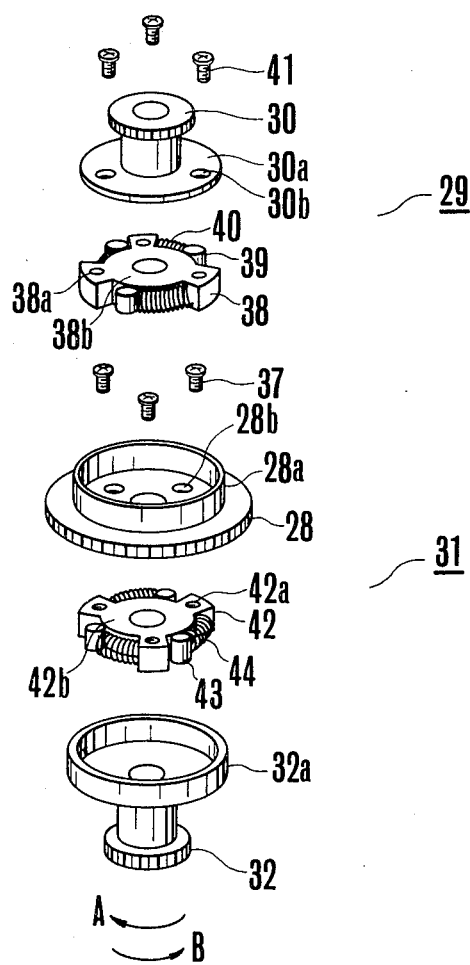
FIG. 7 is an exploded perspective view of a clutch used in the embodiment of FIG. 6.

FIGS. 6, 7 and 8 are, respectively, a diagram of an arrangement of a gear train for gear ratio change, and an exploded perspective view of a clutch and an electrical circuit diagram showing another embodiment of the present invention. In the figures, M is a motor; element 27 is an 11th gear affixed to the shaft of the motor M; element 28 is a 12th gear meshing with the 11th gear 27 and linked with a one-way clutch as shown in FIG. 7; elements 29 and 31 are first and second one-way clutches of which the details are shown in FIG. 7; element 30 is a 13th gear linked with the first one-way clutch 29; element 32 is a 14th gear linked with the second one-way clutch 31; element 33 is a 15th gear serving as an idle gear meshing with both the 14th gear 32 and a 16th gear 34. The 16th gear 34 has a first geared portion 34a meshing with the 15th gear and a second geared portion 34b meshing with a 17th gear 35. The 17th gear 35 is provided with a first geared portion 35a meshing with the 16th gear and a second geared portion 35b meshing with a winding-up gear 36. The winding-up gear 36 meshes not only with the 17th gear but also with the 13th gear 30, and carried at the top end thereof is the winding-up coupler 6 shown in FIG. 2.

The clutch of FIG. 7 is comprised of the first one-way clutch 29 arranged between the above-described 13th gear 30 and 12th gear 28 and the second one-way clutch 31 arranged between the 14th gear 32 and 12th gear 28; element 28a is a cylindrical part provided on the upper surface of the 12th gear 28; 28b are holes for screws 37 for fastening the clutch 31 at holes 42a. On the lower surface of the 13th gear 30 there are provided a flanged portion 30a and holes 30b for screws 41 fastening the clutch 29 at holes 38a. On the upper surface of the 14th gear 32, there is provided a tubular portion 32a, against the inner peripheral surface of which are pressed rollers 43 of a hub 42 in the second one-way clutch 31. Similarly, against the inner peripheral surface of the tubular portion 28a of the 12th gear 28 are pressed rollers 39 of a hub 29 in the first one-way clutch 29; elements 40 and 44 are springs. Thus, the gears 28, 30 and 32 and the clutches 29 and 31 are arranged in coaxial relation to each other to transmit the torque in either of directions indicated by arrows A and B.

In the circuit of FIG. 8, a part different from that in the circuit of FIG. 5 is a change-over switch for the motor M, and the other parts are the same as those in FIG. 5 and are denoted by the same reference characters. In the figure, at both ends of the motor M there are shown change-over switches S5 and S6 cooperating with each other. Switch S1, which is actuable by the relay 1, is connected in series with the above-described switch S5. The switches S5 and S6 are arranged upon depression of the gear ratio change button 45 (8 in FIG. 2) to invert the connection of the motor M.

The operation of the second embodiment of the present invention of FIGS. 6, 7 and 8 is as follows. In the condition where the button 8 of FIG. 2 is not depressed, the button 45 also is not pushed in so that the switches S5 and S6 are both set in the "a" positions. When the switch S1 is moved to the NO position, the motor M is supplied with current flowing in a direction of the arrow so as to rotate in a forward direction. In FIG. 6, as the motor M rotates in the forward direction, the 11th gear 27 and 12th gear 28 rotate at this time, the first one-way clutch 29 is rendered effective, permitting the driving force to be transmitted to the 13th gear 30, while the second one-way clutch 31 does not function to transmit the driving force to the 14th gear 32. Therefore, motion of the motor M is transmitted from the output shaft thereof through the 11th gear 27, 12th gear 28, first one-way clutch 29, 13th gear 30, and winding-up gear 36 to the winding-up coupler 6 and therefrom further transmitted to the camera. During this time, although the 17th gear 35, 16th gear 34, 15th gear 33 and 14th gear 32 are all rotated along with the winding gear 36 and since the one-way clutch 31 between the 12th gear 28 and 14th gear 32 is ineffective, no driving force transmission between the motor M and the winding-up coupler 6 results.

When the button 8 of FIG. 2 is pushed to change the gear ratio, the switches S5 and S6 of FIG. 8 are both moved to the "b" positions where the polarity of the motor M is inverted. Therefore, the motor M rotates in the reversed direction, causing the 11th gear 27 and 12th gear 28 to rotate in the reversed direction; thus, the first one-way clutch 29 is rendered so as to no longer be effective and, instead, the second one-way clutch 31 is rendered effective to transmit motion of the motor M through the 11th gear 27, 12th gear 28, second one-way clutch 31, 14th gear 32, 15th gear 33, 16th gear 34, 17th gear 35 and winding-up gear 36 to the winding-up coupler 6, and therefrom to the camera. During this time, although the 13th gear 30 rotates along with the winding-up gear 36, since the first one-way clutch 29 is idle, it is not involved with the driving force transmission between the motor M and the winding-up coupler 6. It is noted that, although the direction of rotation of the motor M is reversed, the above-described driving force transmission path assures the same direction of rotation of the winding-up coupler 6 as when the button 8 is not depressed. Therefore, with the motor drive unit 4 attached to the camera by the screw 7 of FIG. 2, it is possible to change the gear ratio depending upon whether or not the button 8 is depressed. This is achieved by reversing the direction of rotation of the motor M with automatic selection of either of the one-way clutches 29 and 31 for positive connection.

The operation of the one-way clutches shown in FIG. 7 will now be explained. When the motor rotates in the forward direction, the 12th gear 28 rotates in the direction of arrow A, causing the rollers 39 to be constrained between the inner periphery of the tubular portion 28a of the 12th gear and the tapered portions 38b of the hub. Thus, the 12th gear 28 and the hub 38 are caused to rotate in unison and, therefore, the 13th gear 30 rotates in unison with the 12th gear 28 to perform transmission of torque. Again, when the 12th gear 28 rotates in the direction of arrow A, the hub 42 affixed to the 12th gear 28 also rotates in the direction of arrow A, thereby the rollers 43 depart from the inner periphery of the tubular portion 32a of the 14th gear 32 and the tapered portions of the hub 42. Thus, the rotation of the 12th gear 28 does not lead to rotate the 14th gear 32. Next, when the motor M rotates in the reversed direction, the 12th gear 28 rotates in the direction of arrow B. In this case, since the direction of rotation of the 12th gear 28 is opposite to that described above, the rollers 39 act in a departing direction within the spaces between the inner periphery of the tubular portion 28a and the tapered portions 38b of the hub 38, while the rollers 43 act in the constraining direction within the spaces between the inner periphery of the tubular portion 32a and the tapered portions 42b. Therefore, the rotation of the 12th gear 28 leads to rotate the 14th gear 32 but does not cause the 13th gear 30 to rotate.

As has been described in the foregoing embodiments, the motor drive unit having variable winding speed characteristics according to the present invention can perform the operation in a manner better suited to the given environmental conditions such as temperature. This is done by changing the gear ratio to either of two values near the point of maximum efficiency and the point of maximum power output of the characteristic curves of the motor. It is further possible to extend the stabilized range of exposure periods by combinations of the above-described gear ratio changes with timer time changes.

Although the above embodiments are illustrated and described as being provided with two discrete values of gear ratio, it is possible to provide three or more values. With regard to the timer change, it is also possible to provide a number of switchable positions other than four.

While the foregoing description and drawings represent the preferred embodiments of the present invention, it will be obvious to those skilled in the art that various changes and modifications may be made therein without departing from the true spirit and scope of the present invention.

What is claimed is:

1. An automatic winding-up device having an electric motor for performing winding-up operation by the driving force of said motor, comprising:
   (a) driven winding-up means;
   (b) motion transmitting means for drivingly connect said motor with said driven winding-up means, said motion transmitting means having two different transfer factors, one being a value at which said motor produces a torque of a maximum efficiency or a torque close thereto and the other being a value at which the motor produces a maximum output torque or a torque close thereto; and (c) selecting means operatively connected to said motion transmitting means for selecting either of said two transfer factors.

2. An automatic winding-up device having an electric motor for performing winding-up operation by the driving force of said motor, comprising:
   (a) driven winding-up means;
   (b) motion transmitting means for drivingly connecting said motor with said driven winding-up means, said motion transmitting means having two different transfer factors, one being a value at which said motor produces a torque of a maximum efficiency or a torque close thereto and the other being a value at which the motor produces a maximum output torque or a torque close thereto; and
   (c) selecting means operatively connected to said motion transmitting means for selecting either of said two transfer factors,
   and wherein one of the gear ratios is pre-adjusted to a value corresponding to the maximum efficiency of said motor with said motion transmitting means, or to a value in the neighborhood thereof.

3. An automatic winding-up device according to claim 2, wherein said selecting means has electromagnetic change-over means, said motion transmitting means being receptive of a change-over signal for varying the gear ratio.

4. An automatic winding-up device according to claim 2, wherein said selecting means has change-over operating means, said motion transmitting means being varied to a predetermined gear ratio by change-over operation.

5. An automatic driving device for a camera receptive of driving force for performing the driving of a material element necessary to exposures, comprising:
   (a) a drive source having an electric motor with power supplied by a battery;
   (b) motion transmitting means drivingly connected to said drive source to feed said material element with driving force, said motion transmitting means being adjustable to two different transfer factors, one of which has a value corresponding to the maximum efficiency point of said drive source for the rated load on said drive source, or in the neighborhood thereof,
   and wherein the other of said two different transfer factors is a value corresponding to the maximum power output point of said drive source for the rated load thereon, or in the neighborhood thereof.

6. An automatic driving device for a camera having an electric motor, the driving force of which for driving a material element for taking exposures, comprising:
   (a) motion transmitting means for transmitting motion of said electric motor to said material element, said motion transmitting means having a first transfer factor in allowing the power output of said motor at maximum or in the neighborhood thereof for the load given on said motor when said material element is driven, and a second transfer factor in allowing the efficiency of said motor at maximum or in the neighborhood thereof; and
   (b) selecting means operatively connected to said transmitting means for selecting either of said first and said second transfer factors, said motion transmitting means being adjusted to the selected transfer factor.

7. An automatic driving device according to claim 6, also including:
   (a) timer means, said means forming an output signal after the elapse of a predetermined time; and
   (b) an electrical energy supply control circuit electrically connected to said motor for supplying electrical energy to effect driving power and operatively connected to said timer circuit upon production of the timer output to supply electrical energy for driving power to said motor.

* * * * *